(12) United States Patent
Wang et al.

(10) Patent No.: US 10,902,184 B2
(45) Date of Patent: *Jan. 26, 2021

(54) MAPPING OF DOCUMENTS WITH GLOBAL TAGGING MAP

(71) Applicant: INTERNATIONAL BUSINESS MACHINES CORPORATION, Armonk, NY (US)

(72) Inventors: Bing Xin Wang, Beijing (CN); Yi Yao, Beijing (CN); Ming Zhao, Beijing (CN); Yu Zhao, Ningbo (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/271,699

(22) Filed: Feb. 8, 2019

(65) Prior Publication Data

US 2019/0171698 A1 Jun. 6, 2019

Related U.S. Application Data

(63) Continuation of application No. 14/858,428, filed on Sep. 18, 2015, now Pat. No. 10,430,501.

(51) Int. Cl.
*G06F 40/14* (2020.01)
*G06T 11/20* (2006.01)
(Continued)

(52) U.S. Cl.
CPC ............ *G06F 40/14* (2020.01); *G06F 40/131* (2020.01); *G06F 40/151* (2020.01); *G06T 11/206* (2013.01)

(58) Field of Classification Search
CPC ............... G06F 17/218; G06F 3/04842; G06F 3/04845; G06F 17/2241; G06F 17/2247;
(Continued)

(56) References Cited

U.S. PATENT DOCUMENTS 6,092,081 A 7/2000 Alpert
8,200,669 B1 6/2012 Iampietro et al.
(Continued)

OTHER PUBLICATIONS

P. Mell, et al. "*The NIST Definition of Cloud Computing*", NIST Special Publication 800-145, Sep. 2011, Gaithersburg, MD.
(Continued)

*Primary Examiner* — Kyle R Stork
(74) *Attorney, Agent, or Firm* — Stephanie Carusillo, Esq.; George Blasiak, Esq.; Heslin Rothenberg Farley & Mesiti

(57) ABSTRACT

The present disclosure provides, in part, methods, computer program products, systems, for providing a method. In one embodiment a method can include for example applying tags to a first document according to a tagging map; and applying tags to a second document according to the tagging map. In one embodiment a method can include parsing first content of a first document and second content of a second document using a tagging map; and generating an output document using the tagging map, wherein the generating included presenting in first and second different areas defining the output document the first content and the second content. In one embodiment, a method can include providing a custom tagging map based on one or more user defined input; and applying tags to a document using the custom tagging map.

25 Claims, 15 Drawing Sheets

(51) Int. Cl.
*G06F 40/131* (2020.01)
*G06F 40/151* (2020.01)

(58) Field of Classification Search
CPC .... G06F 17/2705; G06F 40/14; G06F 40/131; G06F 41/151; G06T 11/206
See application file for complete search history.

(56) References Cited

U.S. PATENT DOCUMENTS

| | | | |
|---|---|---|---|
| 8,280,892 | B2 | 10/2012 | Marvit |
| 8,346,776 | B2 | 1/2013 | Bird et al. |
| 8,429,519 | B2 | 4/2013 | Parks et al. |
| 9,679,404 | B2 | 6/2017 | Douglas |
| 2003/0018661 | A1 | 1/2003 | Darugar |
| 2005/0138052 | A1 | 6/2005 | Zhou |
| 2009/0276488 | A1 | 11/2009 | Alstad |
| 2009/0281970 | A1 | 11/2009 | Mika |
| 2010/0114977 | A1 | 5/2010 | Bacher |
| 2011/0138340 | A1 | 6/2011 | Holm-Petersen |
| 2014/0169767 | A1 | 6/2014 | Goldberg |
| 2017/0083483 | A1 | 3/2017 | Wang |

OTHER PUBLICATIONS

Wang, Jie et al. "*Content Information Extraction of Theme Web Pages Based on Tag Information,*" 2014 Seventh International Symposium on Computational Intelligence and Design, pp. 501-504, Dec. 2014.
Notice of Allowance, U.S. Application No. 14/858,428, filed Sep. 18, 2015, dated May 14, 2019.
List of IBM Patent and/or Patent Applications treated as related for U.S. Appl. No. 16/271,699, filed Feb. 8, 2019, dated Jul. 16, 2019.
Non-Final Office Action, U.S. Appl. No. 14/858,428, filed Sep. 18, 2015, dated Jan. 31, 2017.
Applicant's Response to Non-Final Office Action, U.S. Appl. No. 14/858,428, filed Sep. 18, 2015, dated May 1, 2017.
Final Office Action, U.S. Appl. No. 15/858,428, filed Sep. 18, 2015, dated Jul. 6, 2017.
Applicant's Response to Final Office Action, U.S. Appl. No. 15/858,428, filed Sep. 18, 2015, dated Sep. 6, 2017.
Advisory Action, U.S. Appl. No. 15/858,428, filed Sep. 18, 2015, dated Sep. 28, 2017.
Applicant's Petition to Remove Finality of Action, U.S. Appl. No. 15/858,428, filed Sep. 18, 2015, dated Oct. 18, 2017.
Decision on Petition to Remove Finality of Action, U.S. Appl. No. 15/858,428, filed Sep. 18, 2015, dated Dec. 29, 2017.
Non-Final Office Action, U.S. Appl. No. 15/858,428, filed Sep. 18, 2015, dated Jan. 8, 2018.
Applicant's Response to Non-Final Office Action, U.S. Appl. No. 15/858,428, filed Sep. 18, 2015, dated Apr. 8, 2018.
Non-Final Office Action, U.S. Appl. No. 15/858,428, filed Sep. 18, 2015, dated Jul. 17, 2018.
Applicant's Response to Non-Final Office Action, U.S. Appl. No. 15/858,428, filed Sep. 18, 2015, dated Jul. 31, 2018.

History of cloud computing

Cloud computing is a model for enabling ubiquitous network access to a shared pool of configurable computing resources.

1. Origin of the term
The origin of the term cloud computing is unclear. The expression cloud is commonly used in science to describe a large agglomeration of objects that visually appear from a distance as a cloud and describes any set of things whose details are not inspected further in a given context. Another explanation is that the old programs to draw network schematics surrounded the icons for servers with a circle, and a cluster of servers in a network diagram had several overlapping circles, which resembled a cloud.
References to cloud computing in its modern sense appeared as early as 1996, with the earliest known mention in a Compaq internal document.
The popularization of the term can be traced to 2006 when Amazon.com introduced the Elastic Compute Cloud.

2. The 1970s
During the mid-1970s, time-sharing was popularly known as RJE (Remote Job Entry); this terminology was mostly associated with large vendors such as IBM and DEC.[citation needed] IBM developed the VM Operating System (first released in 1972) to provide time-sharing services [citation needed] via virtual machines.

3. The 1990s
In the 1990s, telecommunications companies, who previously offered primarily dedicated point-to-point data circuits, began offering virtual private network (VPN) services with comparable quality of service, but at a lower cost.

4. The New Millenium: 2000s
Since 2000 cloud computing has come into existence. In early 2008, NASA's OpenNebula, enhanced in the RESERVOIR European Commission-funded project, became the first open-source software for deploying private and hybrid clouds, and for the federation of clouds.
Microsoft Azure became available in late 2008.
In July 2010, Rackspace Hosting and NASA jointly launched an open-source cloud-software initiative known as OpenStack. The OpenStack project intended to help organizations offer cloud-computing services running on standard hardware. The early code came from NASA's Nebula platform as well as from Rackspace's Cloud Files platform.
On March 1, 2011, IBM announced the IBM SmartCloud framework to support Smarter Planet. Among the various components of the Smarter Computing foundation, cloud computing is a critical piece.
On June 7, 2012, Oracle announced the Oracle Cloud. While aspects of the Oracle Cloud are still in development, this cloud offering is posed to be the first to provide users with access to an integrated set of IT solutions.

*FIG. 11*

Cloud Computing- everything as a service

Though service-oriented architecture advocates "everything as a service", cloud-computing providers providers offer their "services" according to different models, which happen to form a stack: infrastructure-, platform- and software-as-a-service.

- Infrastructure as a service (IaaS)

In the most basic cloud-service model - and according to the IETF (Internet Engineering Task Force) - providers of IaaS offer computers – physical or (more often) virtual machines – and other resources. (A hypervisor, such as Xen, Oracle VirtualBox, KVM, VMware ESX/ESXi, or Hyper-V runs the virtual machines as guests. Pools of hypervisors within the cloud operational system can support large numbers of virtual machines and the ability to scale services up and down according to customers' varying requirements. IaaS clouds often offer additional resources such as a virtual-machine disk-image library, raw block storage, file or object storage, firewalls, load balancers, IP addresses, virtual local area networks (VLANs), and software bundles.[53] IaaS-cloud providers supply these resources on-demand from their large pools of equipment installed in data centers. For wide-area connectivity, customers can use either the Internet or carrier clouds (dedicated virtual private networks).

- Platform as a service (PaaS)

In the PaaS models, cloud providers deliver a computing platform, typically including operating system, programming-language execution environment, database, and web server. Application developers can develop and run their software solutions on a cloud platform without the cost and complexity of buying and managing the underlying hardware and software layers. With some PaaS offers like Microsoft Azure and Google App Engine, the underlying computer and storage resources scale automatically to match application demand so that the cloud user does not have to allocate resources manually. The latter has also been proposed by an architecture aiming to facilitate real-time in cloud environments Even more specific application types can be provided via PaaS, e.g., such as media encoding as provided by services as bitcodin transcoding cloud or media.io.

- Software as a service (SaaS)

In the SaaS model, cloud providers install and operate application software in the cloud and cloud users access the software from cloud clients. Cloud users do not manage the cloud infrastructure and platform where the application runs. This eliminates the need to install and run the application on the cloud user's own computers, which simplifies maintenance and support. Cloud applications differ from other applications in their scalability—which can be achieved by cloning tasks onto multiple virtual machines at run-time to meet changing work demand. Load balancers distribute the work over the set of virtual machines. This process is transparent to the cloud user, who sees only a single access-point. To accommodate a large number of cloud users, cloud applications can be *multitenant*, meaning that any machine may serve more than one cloud-user organization.

*FIG. 12*

Cloud Computing, virtualization, SOA and Grid Computing

Cloud computing is the result of evolution and adoption of existing technologies and paradigms. The goal of cloud computing is to allow users to take benefit from all of these technologies, without the need for deep knowledge about or expertise with each one of them. The cloud aims to cut costs, and helps the users focus on their core business instead of being impeded by IT obstacles.

The main enabling technology for cloud computing is virtualization. Virtualization software separates a physical computing device into one or more "virtual" devices, each of which can be easily used and managed to perform computing tasks. With operating system–level virtualization essentially creating a scalable system of multiple independent computing devices, idle computing resources can be allocated and used more efficiently. Virtualization provides the agility required to speed up IT operations, and reduces cost by increasing infrastructure utilization. Autonomic computing automates the process through which the user can provision resources on-demand. By minimizing user involvement, automation speeds up the process, reduces labor costs and reduces the possibility of human errors.

Cloud computing also leverages concepts from utility computing to provide metrics for the services used. Such metrics are at the core of the public cloud pay-per-use models. In addition, measured services are an essential part of the feedback loop in autonomic computing, allowing services to scale on-demand and to perform automatic failure recovery.

Cloud computing is a kind of grid computing; it has evolved by addressing the QoS (quality of service) and reliability problems. Cloud computing provides the tools and technologies to build data/compute intensive parallel applications with much more affordable prices compared to traditional parallel computing techniques.

Cloud computing shares characteristics with:

Client–server model — Client–server computing refers broadly to any distributed application that distinguishes between service providers (servers) and service requestors (clients).
Grid computing — "A form of distributed and parallel computing, whereby a 'super and virtual computer' is composed of a cluster of networked, loosely coupled computers acting in concert to perform very large tasks."
Mainframe computer — Powerful computers used mainly by large organizations for critical applications, typically bulk data processing such as: census; industry and consumer statistics; police and secret intelligence services; enterprise resource planning; and financial transaction processing.
Utility computing — The "packaging of computing resources, such as computation and storage, as a metered service similar to a traditional public utility, such as electricity."
Peer-to-peer — A distributed architecture without the need for central coordination. Participants are both suppliers and consumers of resources (in contrast to the traditional client–server model).

*FIG. 13*

Cloud Computing —— 1218

1. Cloud Computing Introduction
Cloud computing is a model for enabling ubiquitous network access to a shared pool of configurable computing resources.

2. History of Cloud Computing —— 1222
Cloud computing appeared as early as 1996, since 2000 cloud computing has come into existence. In 2008, NASA's OpenNebula, became the first open-source software for deploying private and hybrid clouds, and for the federation of clouds. In July 2010, Rackspace Hosting and NASA jointly launched an open-source cloud-software initiative known as OpenStack. In 2011, IBM announced the IBM SmartCloud framework to support Smarter Planet. On June 7, 2012, Oracle announced the Oracle Cloud.

3. Similar Concepts: Virtualization, Grid Computing —— 1222
The main enabling technology for cloud computing is virtualization. Virtualization software separates a physical computing device into one or more "virtual" devices, each of which can be easily used and managed to perform computing tasks.
Cloud computing is a kind of grid computing; it has evolved by addressing the QoS (quality of service) and reliability problems. Cloud computing provides the tools and technologies to build data/compute intensive parallel applications with much more affordable prices compared to traditional parallel computing techniques.

4. Service Models —— 1222
Though service-oriented architecture advocates "everything as a service", cloud-computing providers offer their "services" according to different models, which happen to form a stack: infrastructure, platform and software-as-a-service.

Infrastructure as a service (IaaS)
In the most basic cloud-service model - and according to the IETF - providers of IaaS offer computers – physical or (more often) virtual machines – and other resources.

Platform as a service (PaaS) —— 1226
In the PaaS models, cloud providers deliver a computing platform, typically including operating system, programming-language execution environment, database, and web server. Application developers can develop and run their software solutions on a cloud platform without the cost and complexity of buying and managing the underlying hardware and software layers.

Software as a service (SaaS)
In the software as a service (SaaS) model, users gain access to application software and databases. Cloud providers manage the infrastructure and platforms that run the applications. SaaS is sometimes referred to as "on-demand software" and is usually priced on a pay-per-use basis or using a subscription fee.

*FIG. 14*

MAPPING OF DOCUMENTS WITH GLOBAL TAGGING MAP

CROSS-REFERENCE TO RELATED APPLICATION

This application is a continuation of U.S. application Ser. No. 14/858,428, filed Sep. 18, 2015, titled "Mapping of Documents with Global Tagging Map", which is incorporated by reference herein in its entirety.

TECHNICAL FIELD

The present disclosure relates to tagging of data, and more particularly to tagging of documents.

BACKGROUND

The preparation of a text based presentation document based on prior self-authored content or based on referenced content from other sources can be a time consuming process. For preparation of a document a person typically collects documents of a similar subject matter from a variety of sources. The variety of sources can be, e.g., personal files, files of an enterprise directory, and in some cases Internet posted documents. The person then reviews the documents and identifies useful content from each document. The person then cuts and pastes segments identifies as most relevant into a new document.

Text based presentation documents are available in a variety of different file formats, e.g., WORD and POWERPOINT (PPT), formats maintained by Microsoft Corporation of Redmond, Wash. or Portable Document Format (PDF), a format maintained by Adobe Systems Incorporated of San Jose, Calif.

SUMMARY

The shortcomings of the prior art are overcome, and additional advantages are provided, through the provision, in one aspect, of a method.

In one embodiment a method can include for example applying, by one or more processor, tags to a first document according to a tagging map; and applying, by the one or more processor, tags to a second document according to the tagging map. By using a common tagging map, there is provided a way to commonly organize content from multiple documents.

In one embodiment, the first document and the second document can be of common file formats, (e.g., both WORD documents, PPT documents, PDF documents). In one embodiment, the first document and the second documents can be of different file formats. An embodiment where the first and second documents are of different format increases a range of documents that can be tagged.

In one embodiment, the tagging map applied to the first document and the second document can be a custom tagging map provided based on user defined one or more input. In one embodiment the applying tags can be performed based on user inputs received in a user interface that presents segments of text of a document for tagging. By providing a custom tagging map based on user defined one or more input, a user is allowed to differentiate a tagging map from project to project.

In one embodiment, the applying tags can be performed based on user inputs received in a user interface that graphically presents a representation of a tagging map. The graphical representation can depict hierarchical descriptions of nodes of tagging map.

In one embodiment, the applying tags can be performed based on user inputs received in a user interface that presents to a user a graphical representation of a tagging map together with segmented sections of text of a document and which allows a user to select a segment of the first and second segments and specify a belonging of the segment to a certain node of the tagging map, e.g., by highlighting and moving, (e.g., dragging and dropping) of presented text segments into the graphical representation of the tagging map. Providing visual feedback to a user during the tagging designation process can increase a speed and accuracy with which a document can be tagged.

In one embodiment, a method can include parsing first content of a first document and second content of a second document using a tagging map; and generating an output document using the tagging map, wherein the generating can include presenting in first and second different areas defining the output document the first content and the second content. There is provided therefore an efficient method to generate a document using content from multiple sources in a way that subject matter is presented in an organized manner.

In one embodiment, a generating of a document can include using content of the tagging map. Generating a document can include providing, by the one or more processor, headings for a document based on descriptions of nodes of a tagging map.

In one embodiment, a method can include providing, by one or more processor a custom tagging map based on user defined one or more input; and applying, by the one or more processor, tags to a document using the custom tagging map. By providing a custom tagging map based on user defined one or more input, a user is allowed to differentiate a tagging map from project to project.

In another aspect, a computer program product is provided. The computer program product includes a computer readable storage medium readable by one or more processor and storing instructions for execution by the one or more processor for performing a method. In one embodiment a method can include for example applying tags to a first document according to a tagging map; and applying tags to a second document according to the tagging map. In one embodiment a method can include parsing first content of a first document and second content of a second document using a tagging map; and generating an output document using the tagging map, wherein the generating included presenting in first and second different areas defining the output document the first content and the second content. In one embodiment, a method can include providing a custom tagging map based on user defined one or more input; and applying tags to a document using the custom tagging map.

In a further aspect, a system is provided. The system includes, for instance a memory. In addition, the system includes one or more processor in communication with the memory. Further, the system includes program instructions executable by the one or more processor via the memory to perform a method. In one embodiment a method can include for example applying tags to a first document according to a tagging map; and applying tags to a second document according to the tagging map. In one embodiment a method can include parsing first content of a first document and second content of a second document using a tagging map; and generating an output document using the tagging map, wherein the generating included presenting in first and second different areas defining the output document the first content and the second content. In one embodiment, a method can include providing a custom tagging map based on user defined one or more input; and applying tags to a document using the custom tagging map.

Additional features and advantages are realized through the techniques set forth herein. Other embodiments and aspects are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 11 illustrates a first document for subjecting to tagging herein;

FIG. 12 illustrates a second document for subjecting to tagging herein;

FIG. 13 illustrates a third document for subjecting to tagging herein; and

FIG. 14 illustrates a generated document according to one embodiment herein.

DETAILED DESCRIPTION

Figure 1:
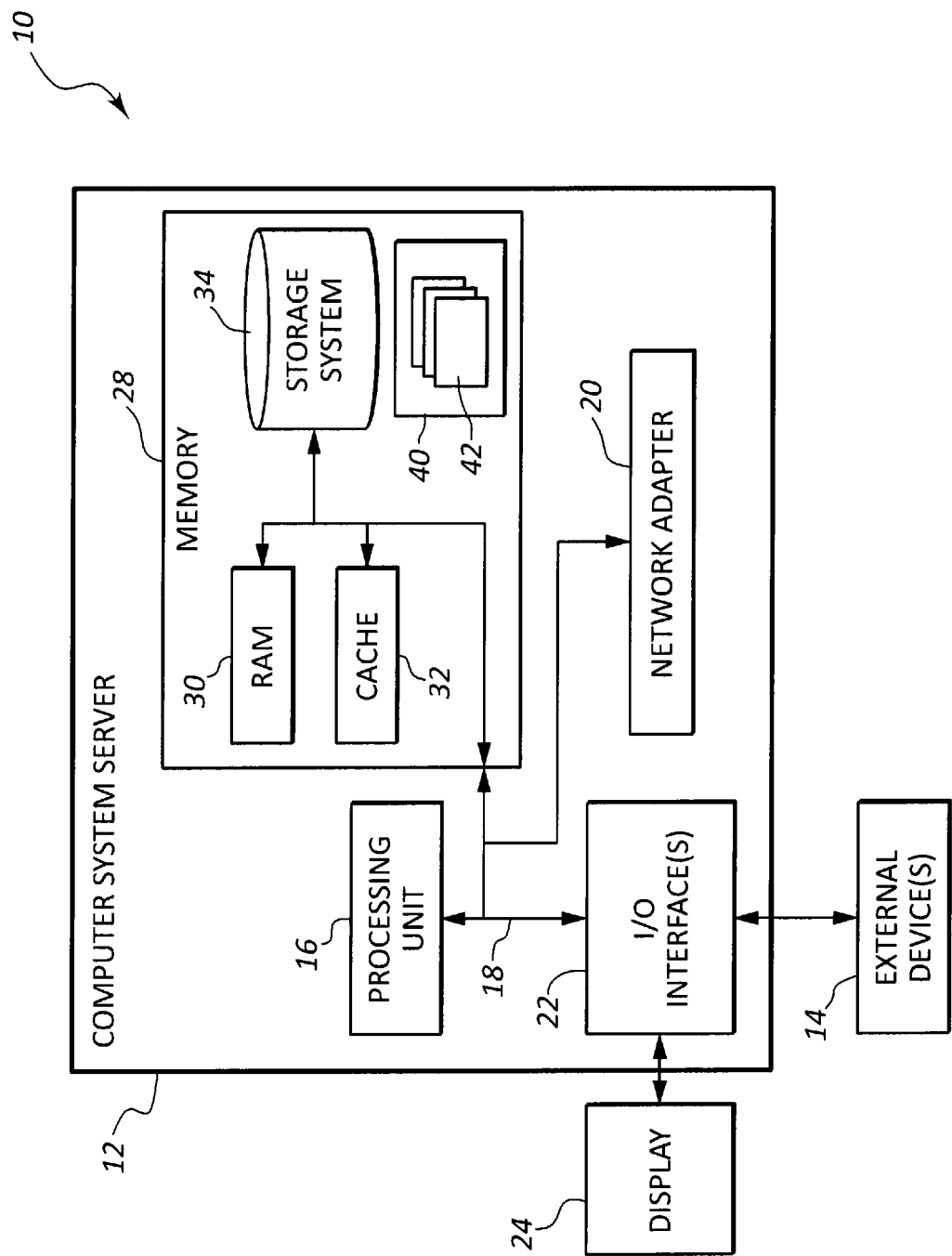
FIG. 1 depicts a cloud computing node according to an embodiment of the present invention.

Aspects of the present disclosure and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the disclosure in detail. It should be understood, however, that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure.

The present disclosure provides, in part, methods, computer program products, systems, for providing a method. In one embodiment a method can include for example applying tags to a first document according to a tagging map; and applying tags to a second document according to the tagging map. In one embodiment a method can include parsing first content of a first document and second content of a second document using a tagging map; and generating an output document using the tagging map, wherein the generating included presenting in first and second different areas defining the output document the first content and the second content. In one embodiment, a method can include providing a custom tagging map based on user defined one or more input; and applying tags to a document using the custom tagging map.

Reference is made below to the drawings, which are not drawn to scale for ease of understanding, wherein the same reference numbers used throughout different figures designate the same or similar components.

FIGS. 1-4 depict various aspects of computing, including cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources, (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms, (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction, (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service, (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser, (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk, (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set, (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices, (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network, (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
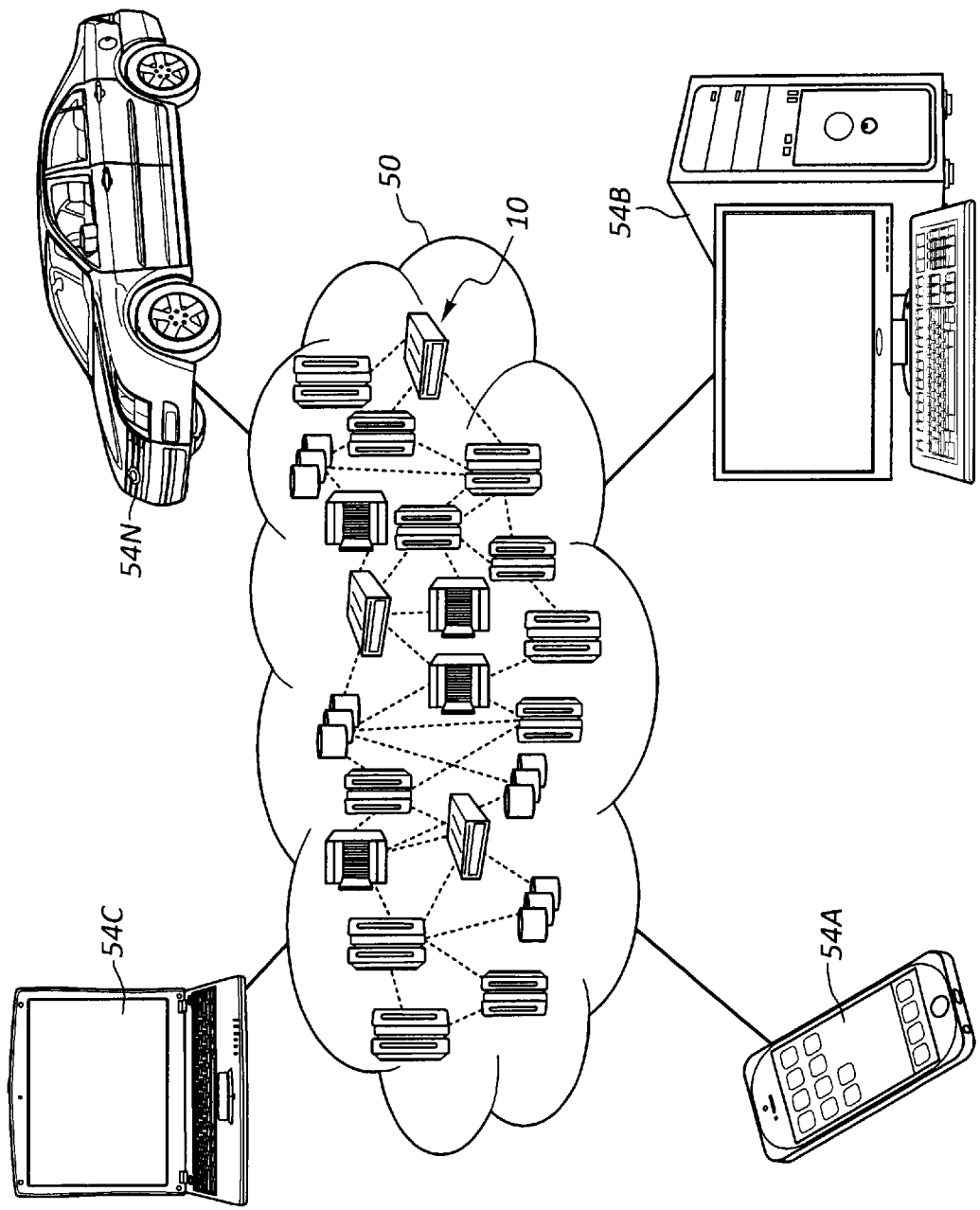
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection, (e.g., using a web browser).

Figure 3:
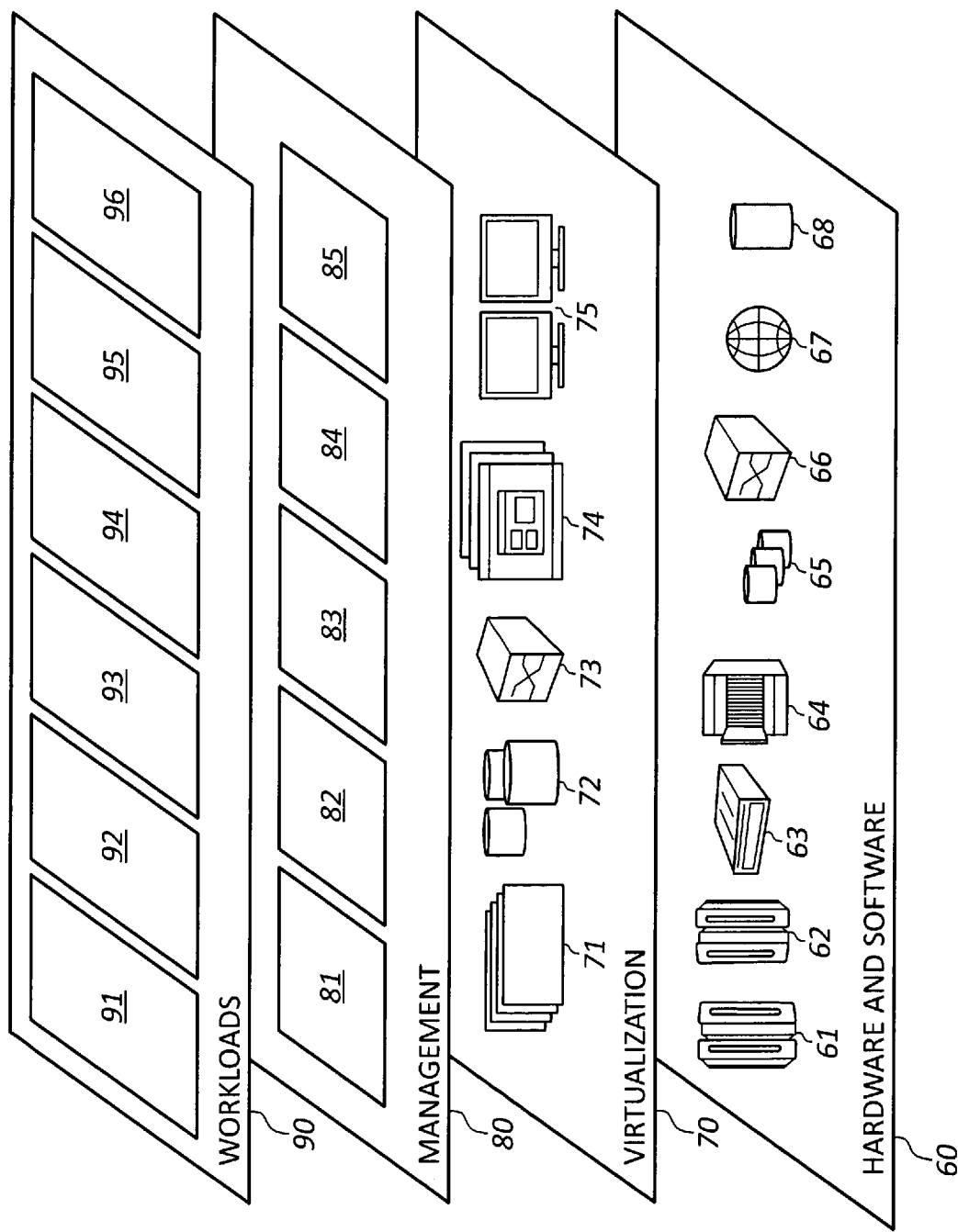
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and document tagging resources 96 as described herein.

Figure 4:
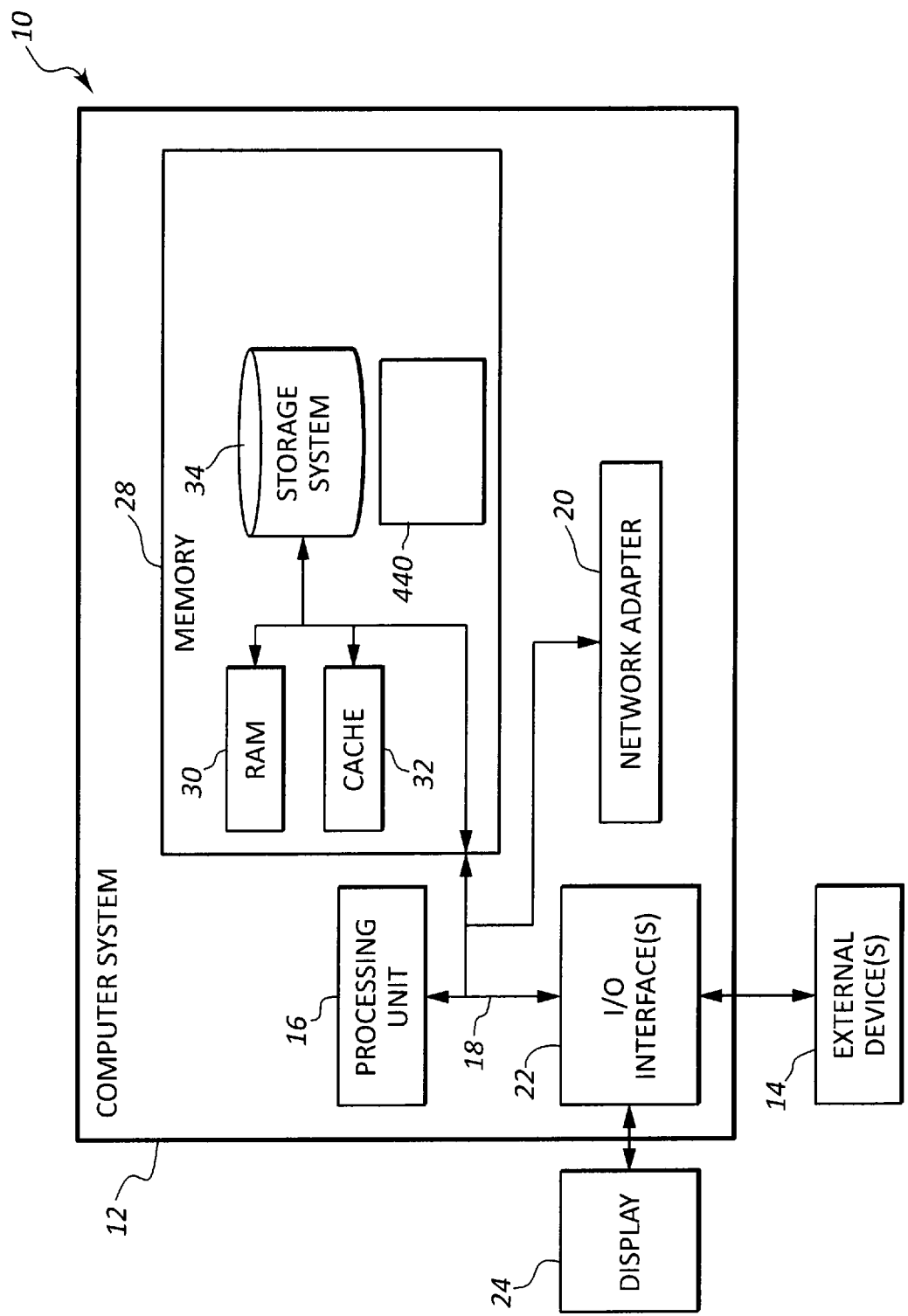
FIG. 4 depicts a hardware overview of a computing node, in accordance with one or more aspects set forth herein.

FIG. 4 depicts a hardware overview of a computing node 10, which may be a cloud computing node, or a computing node other than a cloud computing node, in accordance with one or more aspects set forth herein. The computing node as set forth in FIG. 4 can include the hardware components as set forth in reference to computing node 10 as set forth in reference to FIG. 1. By way of example, computing node 10 may generally be any of the computing devices described herein, such as network devices, client computers, server computers, etc.

Program/utility 40 as set forth in FIG. 1 can provide the functionality of document tagging resources 96 as set forth in FIG. 3. Program/utility 40 as set forth in FIG. 1 can include one or more program 440 as set forth in FIG. 4.

One or more program 440 can have a set (at least one) of program modules, and may be stored in memory 28 by way of example, and not limitation, as well as an operating system, one or more application programs, other program modules, and program data. Each of the operating system, one or more application programs, other program modules, program data, and one or more program, or some combination thereof, may include an implementation of a networking environment. One or more program 440 can generally carry out the functions and/or methodologies of embodiments of the invention as described herein, such as tagging documents.

Referring again to FIG. 4:

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media, (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
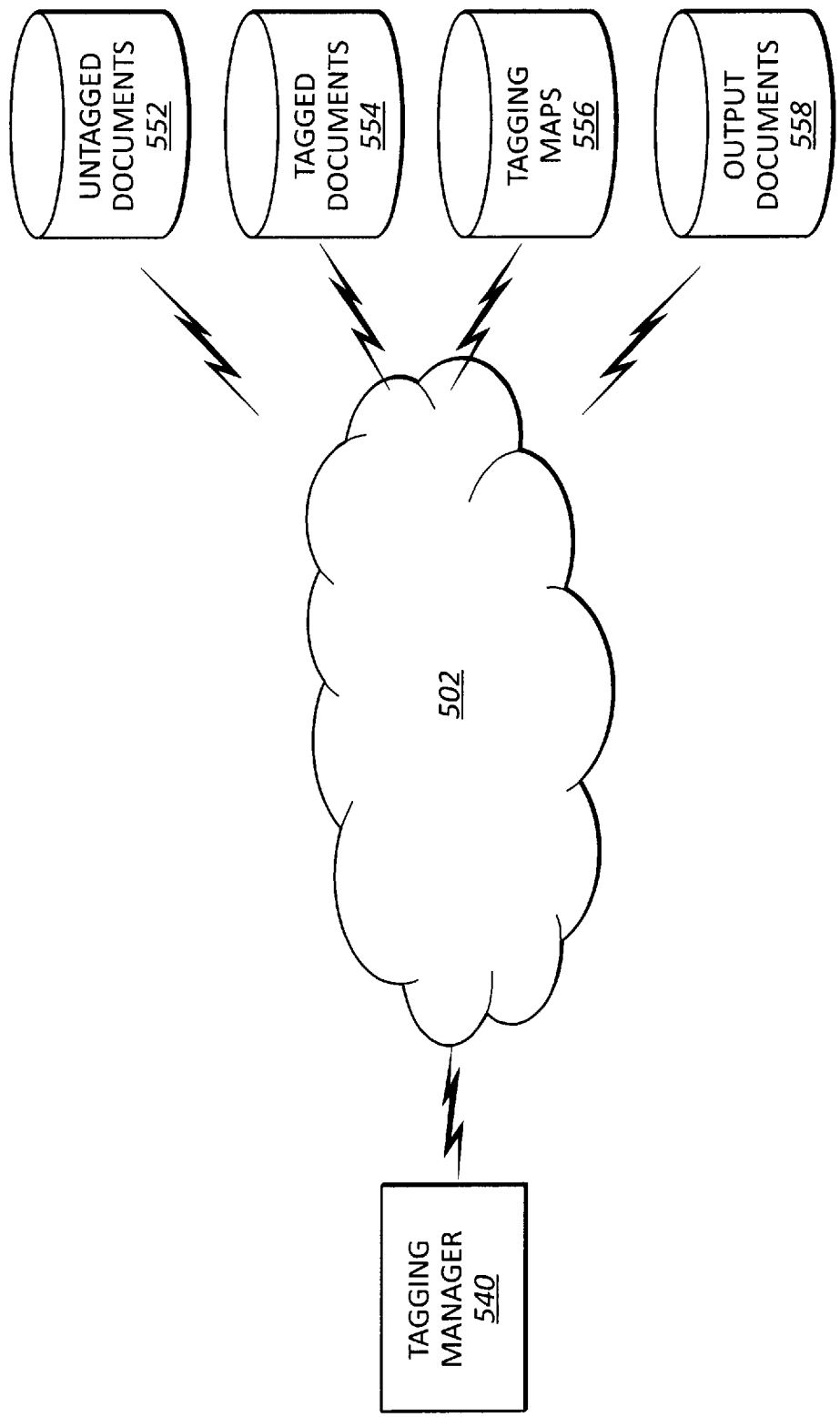
FIG. 5 is an exemplary block diagram of a system, in accordance with one or more aspects set forth herein.

FIG. 5 is an exemplary block diagram of a system 500, in accordance with one or more aspects set forth herein. For example, network 502 may be a physical network or a virtual network. A physical network can be, for example, a physical telecommunications network connecting numerous computer nodes or systems, such as computer servers and computer clients. By contrast a virtual network can, for example, combine numerous physical networks or parts thereof into a logical virtual network. In another example, numerous virtual networks can be defined over a single physical network.

By way of explanation, FIG. 5 depicts an example environment in which one or more requesting tagging manager engine 540 (tagging manager) can tag documents. In one example, a tagging manager 540 tags documents according to a tagging map. In one example tagging manager 540 can generate a document using a tagging map. Tagging manager 540 can be in communication with one or more untagged document database 552, one or more tagged document database 554, one or more tagging map database 556 and one or more generated output document database 558. The one or more databases 552, 554, 556, 558 shown as being in communication via a network 502 can alternatively be co-located at tagging manager 540.

Figure 6:
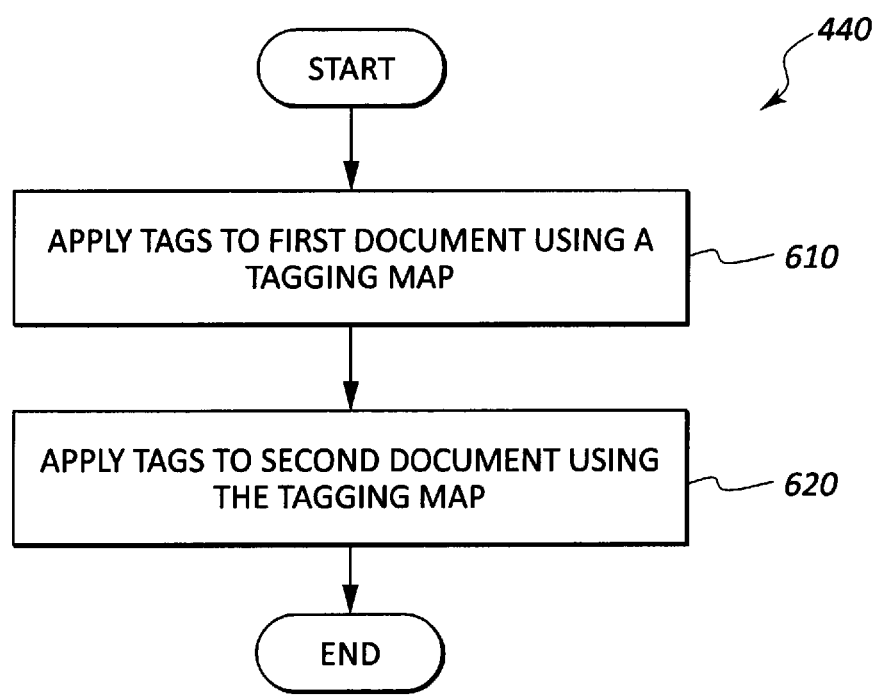
FIG. 6 depicts an embodiment of a method for tagging document in accordance with one or more aspects set forth herein.

FIG. 6 depicts embodiments of a process for tagging first and second documents. By way of example, the processes described with respect to FIG. 6 can be performed using one or more program 440 on one or more device 540 (FIG. 5), as detailed with respect to FIG. 4.

In the embodiment, of FIG. 6, one or more program 440 at block 610 applies tags to a first document using a tagging map; and one or more program 440 at block 620 applies tags to a second document using the tagging map.

In one embodiment, the first document and the second document can be of common file formats, (e.g., both WORD documents, both PPT documents, both PDF documents). In one embodiment, the first document and the second documents can be of different file formats.

In one embodiment, the tagging map applied at block 610 or 620 can be a custom tagging map provided based on user defined one or more input.

In one embodiment, the applying tags at block 610 or block 620 can be performed based on user inputs received in a user interface that presents segmented sections of text of a document for tagging.

In one embodiment, the applying tags at block 610 or block 620 can be performed based on user inputs received in a user interface that graphically presents a representation of a tagging map. The graphical representation can depict hierarchical labels of tagging map.

In one embodiment, the applying tags at block 610 or block 620 can be performed based on user inputs received in a user interface that presents to a user a graphical representation of a tagging map together with segmented sections of text of a document and which allows user designated tagging of a document by selecting and indicating a belonging of a selected text segment in a particular node of the tagging map, e.g., by dragging and dropping of presented text segments into a particular node area of the graphical representation of the tagging map.

Figure 7:
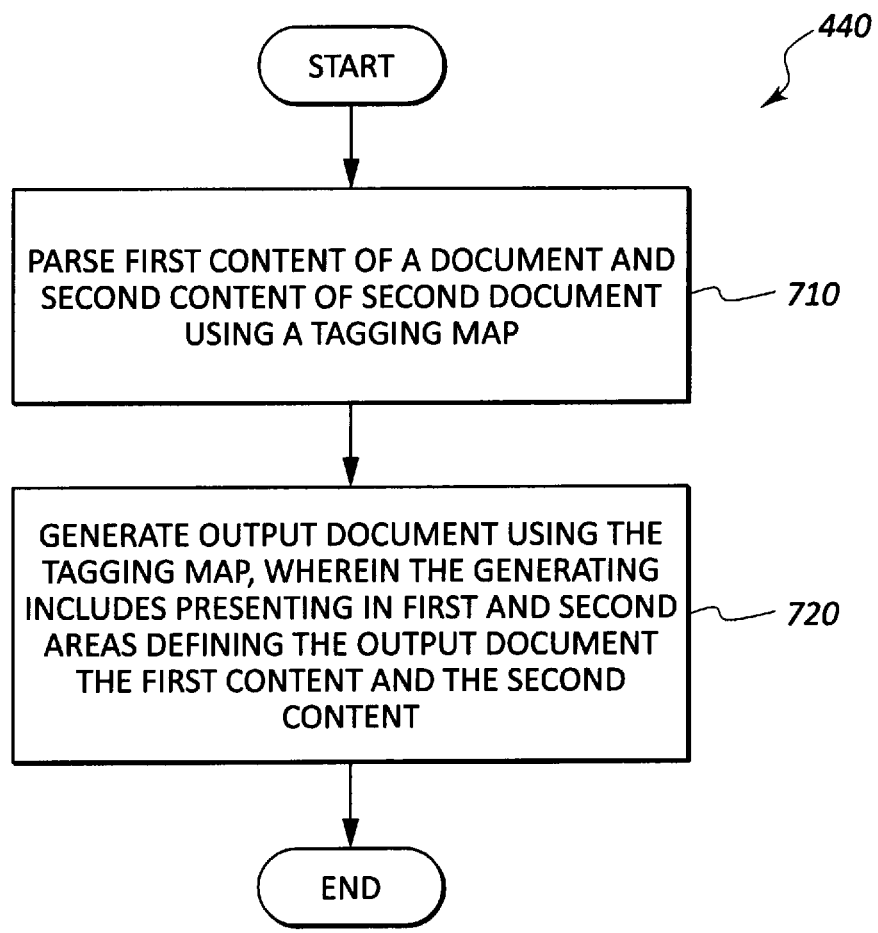
FIG. 7 depicts an embodiment of method for use in generating a document in accordance with one or more aspects set forth herein.

FIG. 7 depicts an embodiments of a method for generating a document by parsing content from a first document according to a tagging map. By way of example, the processes described with respect to FIG. 7 can be performed using one or more program 440 on one or more device 540 (FIG. 5), as detailed with respect to FIG. 4.

In the embodiment of FIG. 7, one or more program 440 at block 710 can include parsing first content of a first document and second content of a second document using a tagging map; and at block 720 generating an output document using the tagging map, wherein the generating can include presenting in first and second different areas defining the output document the first content and the second content.

In one embodiment, a generating of a document can include using content of a content of a tagging map. For generating a document, one or program 440 can provide headings for a document that is generated based on labels of nodes of a tagging map.

Figure 8:
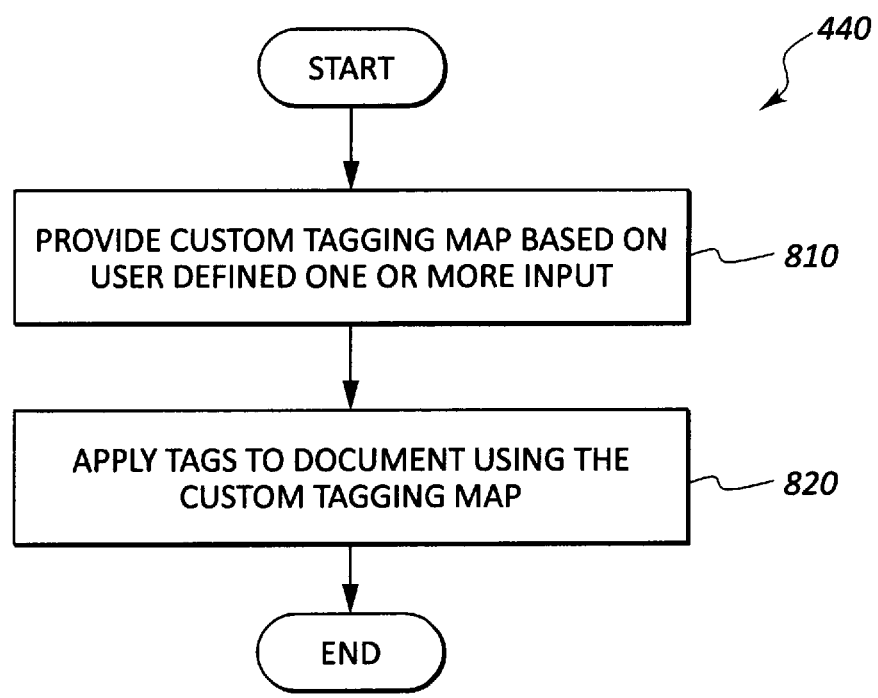
FIG. 8 depicts an embodiment of a method for defining a custom tagging map in accordance with one or more aspects set forth herein.

FIG. 8 depicts an embodiment of a process for tagging a document. By way of example, the processes described with respect to FIG. 8 can be performed using one or more program 440 on one or more device 540 (FIG. 5), as detailed with respect to FIG. 4.

In the embodiment of FIG. 8, one or more program 440 at block 810 provides a custom tagging map based on user defined one or more input; and one or more program 440 at block 820 can apply tags to a document using the custom tagging map.

In one embodiment, the providing at block 810 of a custom tagging map based in user inputs can include presenting a user interface allowing a user to define nodes of a tagging map and relationships between nodes.

In one embodiment, the applying tags at block 820 can be performed based on user inputs received in a user interface that presents segmented sections of text of a document for tagging.

In one embodiment, the applying tags at block 820 can be performed based on user inputs received in a user interface that graphically presents a representation of a tagging map. The graphical representation can depict hierarchical labels of tagging map.

In one embodiment, the applying tags at block 820 can be performed based on user inputs received in a user interface that presents to a user a graphical representation of a tagging map together with segmented sections of text of a document and which allows a user to select a segment of the first and second segments and to specify a belonging of the segment to a certain node of the tagging map by highlighting and moving, (e.g., dragging and dropping) of presented text segments into the graphical representation of the tagging map.

Figure 9A:
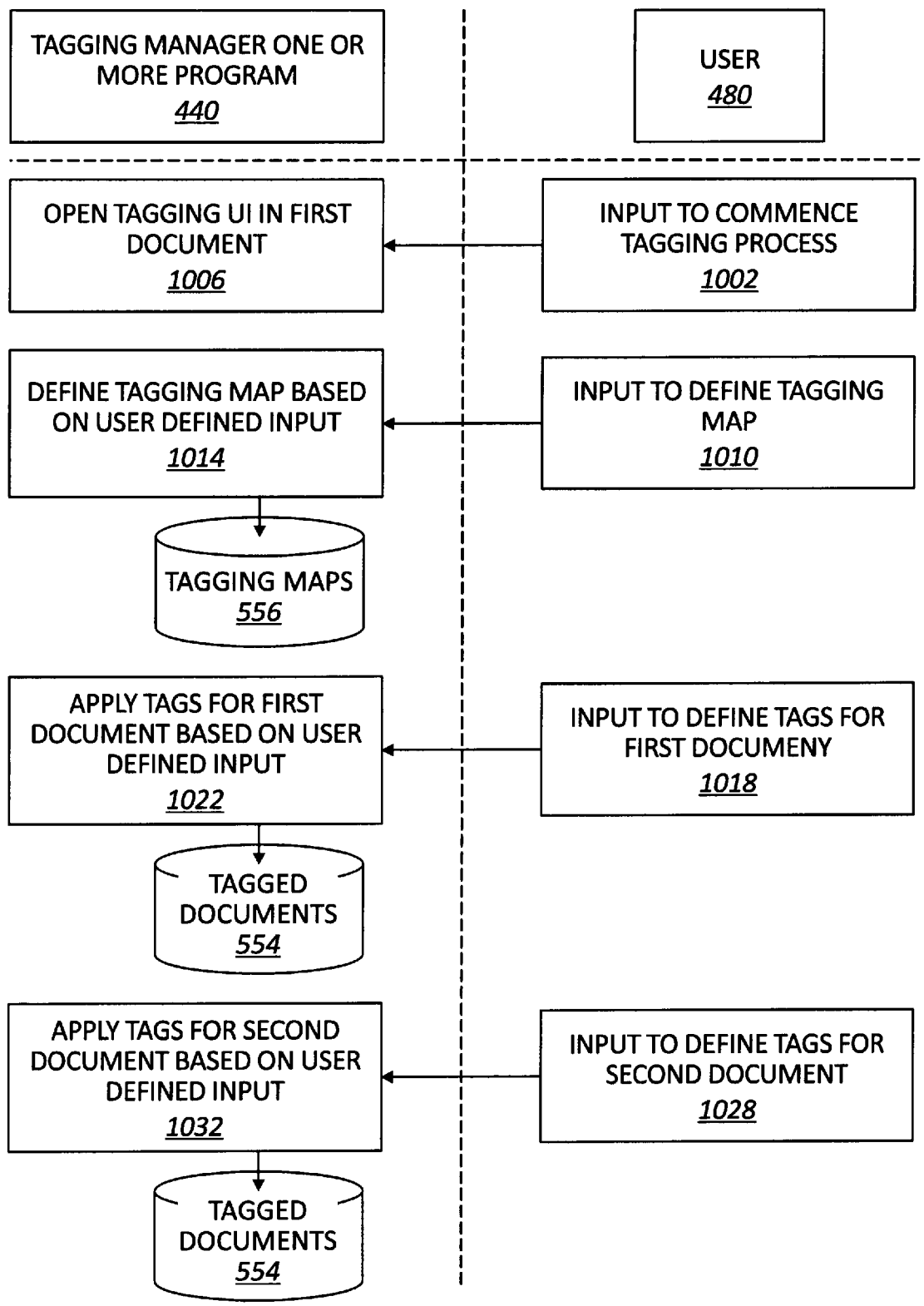
FIGS. 9A-9B are diagrams illustrating further aspects of a process for tagging documents in accordance with one or more aspects set forth herein.
Figure 9B:
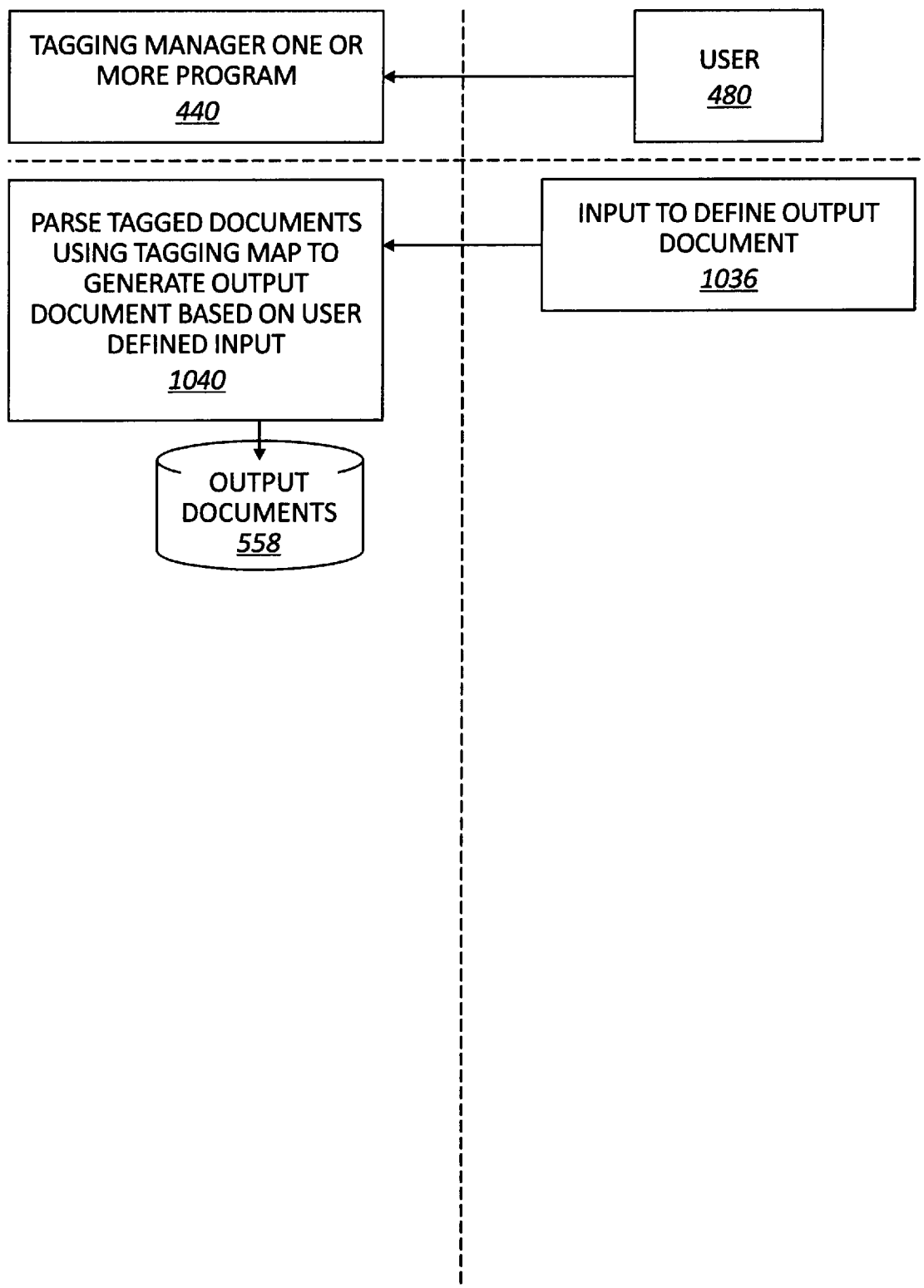

FIGS. 9A-9B are diagrams illustrating further aspects of a process for tagging documents, in accordance with one or more aspects set forth herein. By way of explanation, in FIGS. 9A-9B, processes are illustrated from the point of view of a tagging manager one or more program 440, (e.g., running on tagging manager engine 540 of FIG. 5), and a user 480. User 480 can refer to human user of a user interface of the one or more program 440. A user interface of the one or more program 440 can be presented locally, e.g., of a tagging manager engine 540 or externally, e.g., on an computing node 10 external to tagging manager engine running a browser for display of user interface web pages for initiating inputs to one or more program 440.

In one or more embodiments, one or more program 440 may run on a different collection of physical or virtual machines or processors, depending on the need for scalability of the system. In one specific example, one or more program 440 could run on a single multi-processor server system. In another specific example, various portions of one or more program 440 may run on different processors running on different computing nodes.

By way of overview, FIGS. 9A and 9B illustrate, at least in part, one or more embodiments in which a document can be tagged, in which a first and second documents can be tagged, in which a tagging map can be provided and used, in which a document can be generated using a tagging map. FIGS. 9A and 9B describe a particular exemplary embodiment of one or program 440 and illustrate a variety of functions as examples for illustrative purposes. It will understand that based on a different set or order of user inputs one or more program 440 can provide different functionality than the functionality described with reference to FIGS. 9A and 9B. It will be understood that only a subset of the functions described with respect one or more program 440 be provided and one or more program 440 can provide useful functionality.

With reference to FIG. 9A, in one embodiment, a user can present at block 1002 one or more input to commence a tagging process and at block 1006 one or more program 440 can open a tagging user interface (UI) in the first document.

Prior to block 1006, one or more program 440 can be installed, e.g., on tagging manager engine 540 so that one or more program 440 can be provided as an add on to one or more existing document processing programs, e.g., WORD, PPT, or PDF. At block 1002 and 1006 a user can open a document in a first document program and can activate one or more program 440 to commence tagging operations on the opened document in accordance with one or more program 440.

Figure 10:
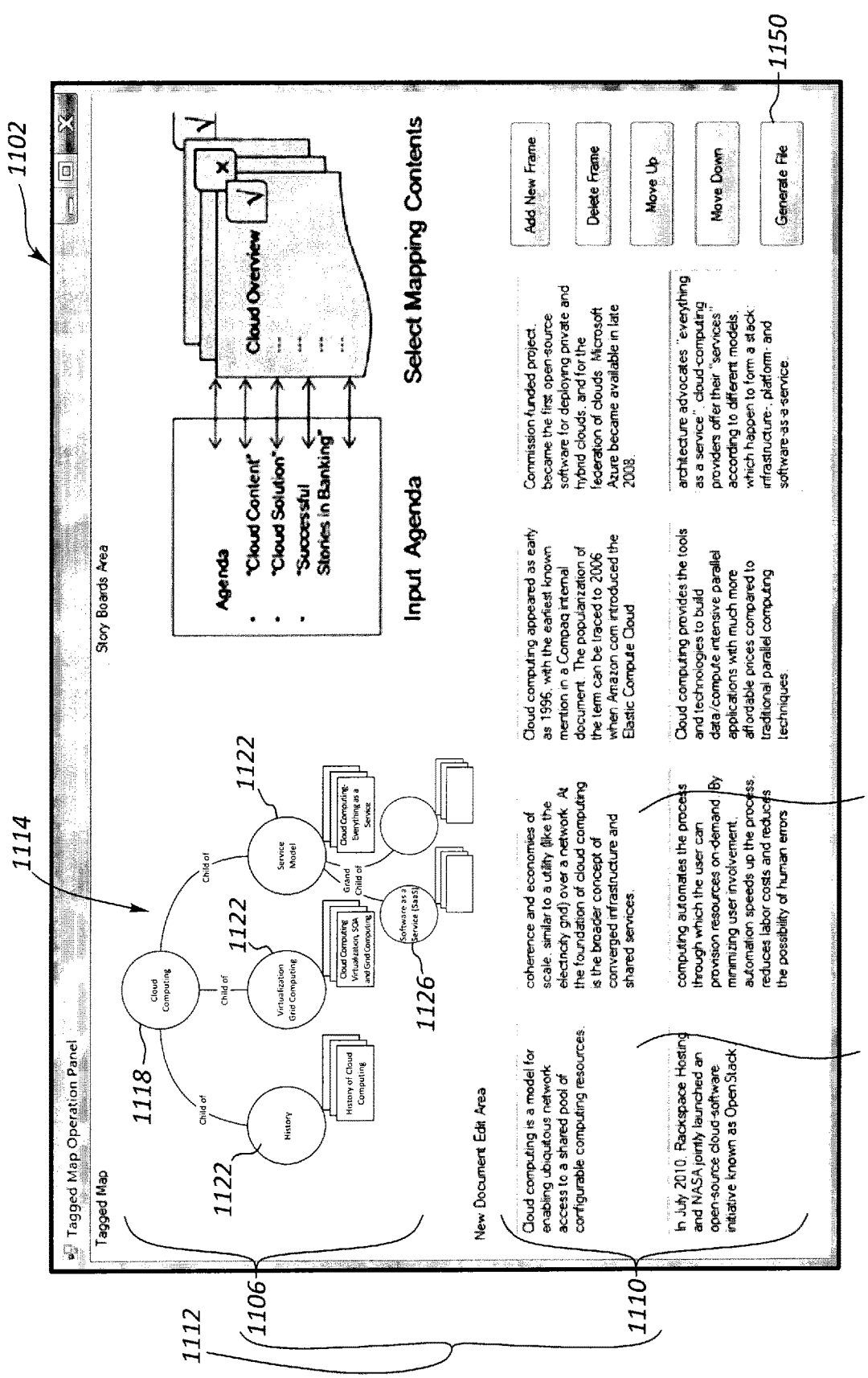
FIG. 10 shows a user interface for use in defining a tagging map and for use in tagging of a document.

An exemplary IU for display on a display that can be presented by one or more program 440 is shown in FIG. 10. UI 1102 which can be displayed on a display 24, (e.g., FIG. 1 or FIG. 4) can have area 1106 for defining a tagging map and an area 1112 (in the specific example having area 1106 and area 1110) for defining tags on content of a current document. According to one example, a tagging map can be provided using a markup language based file format, e.g., can be provided using an XML based file format.

Referring to area 1106, area 1106 can present a current tagging map representation 1114 of a tagging map. The representation can be a graphical representation as shown in FIG. 10. One or more program 440 can be configured so that a user can edit the presented tagging map representation of area 1106. Using UI 1102 a user can, e.g., add nodes, subtract nodes, define description of nodes and/or define relationships including hierarchical relationships between nodes. A node of a tagging map as shown by the representation of FIG. 10 can have a text description. A text description of a node can include a name of the node (shown in the circle section of each node representation) and further description (shown in the rectangle section of each node representation). A tagging map can define parent and child relationships as illustrated by the tagging map representation 1114 of FIG. 10. As shown by FIG. 10, a tagging map can include a parent node as indicated by node representation 1118 and a plurality of child nodes as illustrated by node representations 1122 and grandchild nodes as indicated by representation 1126. Different types of relationships can be defined by a tagging map as will be set forth herein.

Referring to block 1010 a user can provide one or more input to define a tagging map and at block 1014 one or more program 440 can define a tagging map based on the user defined one or more input. One or more program 440 can define a tagging map in the manner described with reference to UI 1102 to, e.g., add tagging map nodes, subtract nodes, and/or define descriptions of nodes, define relationships between nodes. UI 1102 can include an area that allows a user to provide an input to trigger storing of a defined tagging map in a tagging map database 554.

Referring to block 1018 a user can provide one or more input to define tags for a first document and at block 1014 one or more program 440 can define tags for the first document based on the one or more input. As shown in FIG. 10 UI 1102 can have features to allow a user to provide one or more input for defining a tags on a current document. Using area 1112 that includes area 1106 and area 1110 a user can provide one or more input so that one or more program 440 can define tags for current document. In one embodiment, as depicted in FIG. 10 one or more program 440 can display area 1106 and area 1110 simultaneously. Area 1106 can include a tagging map representation 1114 and area 1110 can include presentations of segments of a current document. In one aspect one or more program 440 can parse and display segments of a current document, e.g., in different areas, e.g., areas 1130 and 1132 of UI 1102. Areas 1130 and 1132 can be spaced apart and separated by non-text areas as shown in FIG. 10. One or more program 440 can parse a current document according to a defined logical criteria, e.g., can parse segments according to paragraph, (e.g., every paragraph presented in a different area 1130, 1132) in one configuration or according to page according another configuration, (e.g., every page of a current document presented in a different area 1130, 1132). In one embodiment, one or more program 440 can be configured so that a user can highlight and move, (e.g., drag and drop) a selected segment of an area, e.g. 1130 or 1132, into a node representation, e.g., 1118, 1122, or 1126 and responsively one or more program 440 can define a tag for that segment in accordance with the selected node of the node representation. The selected segment can be tagged to include the text of the selected node. One or more program 440 can include an area so that a user can provide an input to trigger storing of a tagged document in a tagged document database 554.

Referring to block 1028 a user can provide one or more input to define tags for a second document and at block 1032 one or more program 440 can define tags for based on the one or more input. The operation of blocks 1028 and 1032 can be according to the operation of blocks 1018 and 1022 except that a second document can be tagged. One or more program 440 can use the tagging map used at block 1022 for tagging the first document to tag the second document and the same tagging map representation presented during performance of block 1022 can be presented during performance of block 1032. The second document can be in the same file format, (e.g., WORD, PPT or PDF) as the first document or in a different file format. One or more program 440 can be configured to tag first and second documents of the same first file format or of different first and second file formats. For tagging of a second document of a file format of the first document the document processing program of the first document (WORD, PPT, PDF) can be used to open the second document and the described tagging add on can be activated. For tagging of a second document in a second file format a document processing program of the second format (selected from the group, e.g., WORD, PPT, PDF) can be used to open the second document and the described tagging add on can be activated within the second document processing application.

Referring to block 1036 a user can enter one or more input to generate an output document and at block 1040 one or more program 440 can generate an output document. At block 1040 one or more program 440 can use the defined tagging map defined at block 1014 and used at block 1022 and block 1032. At block 1040 one or more program 440 to generate an output document can also use one or more tagged document, e.g., tagged at block 1022 and/or block 1032. In one example, a user can select area 1150 presented by one or more program, 440 to initiate a process for generating an output document. A user can then make additional selections on a user interface presented by one or more program 440 to, e.g., select a tagging map and tagged documents to be parsed during the process for generating the output document.

At block 1040 one or more program 440 can use the tagging map of representation 1114 to parse content of one or more tagged document and to present parsed content in the generated document using the tagging map. For example, for each node of a selected tagging map, one or more program 440 can search each selected tagged document for content that has been tagged according to the text description of the node. In one embodiment, one or more program 440 at block 1040 can present in an output document parsed content according to a hierarchy defined in the selected tagging map. For example, content tagged according to a parent node tag of the generated document can be presented as earlier content (i.e. the first page or beginning) in the output document and child node tagged content can be presented after the earlier content. In another aspect one or more program 440 can use descriptions of nodes of a tagging map to generate the output document at block 1040. One or more program 440 at block 1040 can present descriptions of nodes as headings and/or subheadings of document sections in the output document. Thus, features on one or more program 440 provide a way to easily generate an organized output document having content of previously tagged one or more documents.

Features of one or more program 440 in one embodiment are further illustrated with reference to FIGS. 11-14 illustrating the tagging map represented at area 1106 (FIG. 10) relating to the topic of cloud computing being used to generate an output document.

FIG. 11 illustrates a text based presentation document in WORD format relating to the topic of Cloud Computing. FIG. 12 illustrates a text based document in PPT format relating to the topic of Cloud Computing. FIG. 13 illustrates a text based presentation document in PDF format relating to the topic of Cloud Computing. The respective WORD, PPT and PDF documents can be tagged using the tagging map of representation 1114 at area 1106 (FIG. 10).

FIG. 14 illustrates an output document generated having parsed content of the prior tagged documents. One or more program 440 can use the tagging map of representation 1114 to parse content of the documents of FIGS. 11-13 and to present parsed content in the output document using the tagging map. One or more program 440 can present parsed content according to a hierarchy defined in the tagging map of representation 1114. For example, content tagged according to a parent node tag of the of the generated output document can be presented as earlier content (i.e. the first page or beginning) in the output document and child node tagged content can be presented after the earlier content. In another aspect one or more program 440 can use descriptions of nodes of a tagging map to generate the output document at block 1040. One or more program 440 at block 1040 can present in the output document descriptions of nodes of the tagging map as headings and/or subheadings of documents sections in the output document. For example, in the output document of FIG. 14 one or more program 40 can present the heading 1218 of the output document based on the text description of the parent node of the tagging map represented at area 1118 (FIG. 10) and can present the subheadings 1222 of the output document of FIG. 14 based on the description of child nodes and grandchild nodes of the tagging map represented at areas 1122 and 1126 of tagging map representation 1114 (FIG. 10).

One or more program 440 can include document management add-on functionality, (e.g., an add-on for WORD tool, or add-on for POWERPOINT tool, and/or add-on for PDF reader tool) One or more program 440 can include tagging map viewer functionality (e.g., to facilitate parsing tagging map XML files, and to facilitate dynamically showing the tags and their relationship in visual). One or more program 440 can include tagging map builder functionality (e.g., to manage a tagging map by adding and removing or updating tags, and adding or updating tag relationships). One or more program 440 can include snapshot viewer functionality, (e.g., for creating snapshots for mapped content and to present the content in preview). One or more program 440 can include presentation functionality (e.g., for outputting content of an output document, and storing an output document in a file format that can be selected by a user).

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" encompasses relationships where an element is entirely based on and relationships where an element is partially based on. Forms of the term "defined by" encompasses relationships where an element is entirely defined by as well as relationships where an element is partially defined by. Systems methods and apparatus described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A method comprising:
applying tags to a first document using a tagging map; and
applying tags to a second document using the tagging map, wherein the tagging map is a custom tagging map provided based on user defined one or more input, wherein a user defined one or more input is received using a displayed user interface that presents a graphical representation of the tagging map, wherein the graphical representation of the tagging map includes a plurality of nodes that have descriptions and wherein a hierarchical relationship between a first node and a second node of the plurality of nodes is represented in the graphical representation of the tagging map; and
wherein the applying tags to the first document using the tagging map includes applying tags to the first document based on user specified one or more input, wherein the user defined one or more input is received using the displayed user interface that presents the graphical representation of the tagging map and that presents in different areas of the displayed user interface first and second text segments of the first document parsed from the first document and wherein the displayed user interface allows the user to select the first text segment of the first document and to specify a belonging of the first text segment of the first document to a selected one of the first node or the second node of the tagging map using the graphical representation which represents the hierarchical relationship between the first node and the second node.

2. The method of claim 1, wherein the method includes associating the first text segment of the first document to one of the first node or the second node based on a belonging specified by the user, wherein the method includes generating an output document using the tagging map, wherein the generating includes using the tagging map so that text of the first text segment of the first document is included in the output document according to an order that is based on a hierarchy of the hierarchical relationship between the first node and the second node.

3. The method of claim 1, wherein the displayed user interface allows the user to perform one or more of the following selected from the group consisting of (a) adding a node to the tagging map; (b) subtracting a node from the tagging map; (c) specifying a description of a node of the tagging map, and (d) specifying a hierarchical relationship between nodes of the tagging map.

4. The method of claim 1, wherein the displayed user interface allows the user to specify a hierarchy order between the first node and the second node, and wherein the first node and the second node include text descriptions, wherein the method includes generating an output document using the tagging map, wherein the generating includes using the tagging map so that text of the text descriptions of the first node and second node are included in the output document according to an order that is based on the hierarchy order between the first node and the second node that has been specified by the user.

5. The method of claim 1, wherein the displayed user interface allows the user to specify text description of the first node and the second node, wherein the method includes generating an output document using the tagging map, wherein the generating includes using the tagging map so that text of the text descriptions of the first node and second node is included in the output document.

6. The method of claim 1, wherein the displayed user interface allows the user to specify text description of the first node and the second node, wherein the method includes generating an output document using the tagging map, wherein the generating includes using the tagging map so that text of the text descriptions of the first node and second node is included in the output document, wherein the displayed user interface allows the user to specify a hierarchy order between the first node and the second node, wherein the generating includes using the tagging map so that text of the text descriptions of the first node and second node are included in the output document according to an order that is based on the hierarchy order between the first node and the second node that has been specified by the user.

7. The method of claim 1, wherein the first document is of a first file format and wherein the second document is of a second file format.

8. A method comprising:
applying tags to a first document using a tagging map; and
applying tags to a second document using the tagging map, wherein the tagging map is a custom tagging map provided based on user defined one or more input, wherein the user defined one or more input is received using a displayed user interface that presents a graphical representation of the tagging map and that and that presents in different areas of the displayed user interface first and second text segments of the first document parsed from the first document, wherein the graphical representation of the tagging map includes a plurality of nodes and wherein a hierarchical relationship between a first node and a second node of the plurality of nodes is represented in the graphical representation of the tagging map, and wherein the applying tags to a first document using the tagging map includes applying tags to the first document and wherein the displayed user interface allows the user to select each of the first and second text segments and to specify a belonging of the first and second text segments to a selected one of the first node or the second node of the tagging map using the graphical representation which represents the hierarchical relationship between the first node and the second node, wherein the method includes associating each of the first and second text segments to one of the first node or the second node based on the belonging specified by the user, and wherein the first node and the second node include text descriptions, wherein the method includes generating an output document using the tagging map, wherein the generating includes using the tagging map so that text of the text descriptions of the first node and second node are included in the output document according to an order that is based on a hierarchy of the hierarchical relationship between the first node and the second node.

9. The method of claim 8, wherein displayed user interface allows the user to perform one or more of the following selected from the group consisting of (a) adding a node to the tagging map; (b) subtracting a node from the tagging map; (c) specifying a description of a node of the tagging map, and (d) specifying a hierarchical relationship between nodes of the tagging map, wherein the displayed user interface allows the user to perform each of the following (a) adding a node to the tagging map; (b) subtracting a node from the tagging map; (c) specifying a description of a node of the tagging map and (d) specifying a hierarchical relationship between tagging map nodes.

10. The method of claim 8, wherein the first document is of a first file format and wherein the second document is of a second file format.

11. The method of claim 8, wherein the displayed user interface allows the user to specify the text description of the first node and the second node, wherein the method includes generating the output document so that text of the text descriptions of the first node and second node is included in the output document.

12. The method of claim 8, wherein the displayed user interface allows the user to specify a hierarchy order between the first node and the second node, wherein the generating includes using the tagging map so that text of the text descriptions of the first node and second node is included in the output document according to an order that is based on the hierarchy order between the first node and the second node that has been specified by the user.

13. The method of claim 8, wherein the displayed user interface allows the user to perform each of the following (a) adding a node to the tagging map; and (b) subtracting a node from the tagging map.

14. The method of claim 8, wherein the displayed user interface allows the user to perform each of the following (c) specifying a text based description of a node of the tagging map, and (d) specifying a hierarchy order between nodes of the tagging map.

15. A computer program product comprising:
a computer readable storage medium readable by one or more processing unit and storing instructions for execution by one or more processor for performing a method comprising:
applying tags to a first document using a tagging map; and
applying tags to a second document using the tagging map, wherein the applying tags to a first document using the tagging map includes applying tags to the first document based on user specified one or more input, wherein the user specified one or more input is received using a displayed user interface that presents a graphical representation of the tagging map which graphical representation of the tagging map represents a hierarchical relationship between a first node and a second node of the tagging map and wherein the first node and the second node include text descriptions, wherein the method includes generating an output document using the tagging map, wherein the generating includes using the tagging map so that text of the text descriptions of the first node and the second node is included in the output document according to an order that is based on a hierarchy of the hierarchical relationship between the first node and the second node.

16. The computer program product of claim 15, wherein the displayed user interface presents in different areas of the displayed user interface first and second text segments of the first document parsed from the first document and wherein the displayed user interface allows the user to select a certain segment of the first and second texts segments and to specify a belonging of the certain segment to a selected one of a first node or a second node of the tagging map using the graphical representation of the tagging map, wherein the method includes associating the certain segment to one of the first node or the second node based on the belonging specified by the user.

17. The computer program product of claim 16, wherein the displayed user interface allows the user to perform one or more of the following selected from the group consisting of: (a) adding a node to the tagging map; (b) subtracting a node from the tagging map; (c) specifying a description of a node of the tagging map and (d) specifying a hierarchical relationship between tagging map nodes, and wherein the applying tags to a first document using a tagging map includes applying tags to the first document based on user specified one or more input.

18. The computer program product of claim 16, wherein the displayed user interface presents in different areas of the displayed user interface first and second text segments of the second document parsed from the second document and wherein the displayed user interface allows the user to select a certain segment of the first and second texts segments of the second document and to specify a belonging of the certain segment of the second document to a selected one of a first node or a second node of the tagging map using the graphical representation of the tagging map, wherein the method includes associating the certain segment of the second document to one of the first node or the second node based on the belonging specified by the user.

19. The computer program product of claim 15, wherein the displayed user interface allows the user to perform each of (a) adding a node to the tagging map; and (b) subtracting a node from the tagging map.

20. The computer program product of claim 15, wherein the first document is of a first file format and wherein the second document is of a second file format, wherein the displayed user interface presents the graphical representation of the tagging map and allows the user to perform each of (a) specifying a description of a node of the tagging map; and (b) specifying a hierarchical relationship between nodes of the tagging map, and wherein the applying tags to the first document using the tagging map includes applying tags to the first document based on user specified one or more input, wherein the displayed user interface presents in different areas of the displayed user interface first and second text segments parsed from the first document, wherein the displayed user interface allows the user to (i) select a certain segment of the first and second text segments and to (ii) specify a belonging of the certain segment to a certain node of the tagging map.

21. A computer program product comprising:
a computer readable storage medium readable by one or more processing circuit and storing instructions for execution by one or more processor for performing a method comprising:
parsing first content of a first document and second content of a second document using a tagging map; and
generating an output document using the tagging map, wherein the generating includes presenting in first and second different areas defining the output document the first content and the second content, wherein a displayed user interface displays a graphical representation of the tagging map which tagging map includes a first node and a second node and a hierarchical relationship between the first node and the second node, wherein the displayed user interface presents on the displayed user interface first and second text segments of the first document parsed from the first document and presents on the displayed user interface first and second text segments of the second document parsed from the second document and wherein the displayed user interface allows the user to select the first text segment of the first document and to specify a belonging of the first text segment of the first document to a selected one of the first node or the second node of the tagging map using the graphical representation which represents the hierarchical relationship between the first node and the second node.

22. The computer program product of claim 21, wherein the displayed user interface allows the user to select the first text segment of the second document and to specify a belonging of the first text segment of the second document to a selected one of the first node or the second node of the tagging map using the graphical representation which represents the hierarchical relationship between the first node and the second node, wherein the generating the output document using the tagging map includes presenting text of the first text segment of the first document and text of the first text segment of the second document according to an order that is based on a hierarchy of the hierarchical relationship between the first node and the second node.

23. A system comprising:
a memory;
at least one processor in communication with the memory; and
program instructions executable by one or more processor via the memory to perform a method comprising:
applying tags to a document using a tagging map, wherein the tagging map is a custom tagging map provided based on user defined one or more input, wherein the user defined one or more input is received using a displayed user interface that presents a graphical representation of the tagging map, wherein the graphical representation of the tagging map includes a plurality of nodes that have descriptions and wherein a hierarchical relationship between first and second nodes of the plurality of nodes is represented in the graphical representation of the tagging map and wherein the displayed user interface presents in different areas of the displayed user interface first and second text segments of the document parsed from the document, and wherein the displayed user interface allows the user to select a certain segment of the first and second texts segments and to specify a belonging of the certain segment to a selected one of the first node or the second node of the tagging map using the graphical representation which represents the hierarchical relationship between the first node and the second node, wherein the method includes associating each of the first and second text segments to one of the first node or the second node based on a belonging specified by the user, and wherein the first node and the second node include text descriptions, wherein the method includes generating an output document using the tagging map, wherein the generating includes using the tagging map so that text of the text descriptions of the first node and second node are included in the output document according to an order that is based on a hierarchy of the hierarchical relationship between the first node and the second node.

24. The system of claim 23, wherein the displayed user interface allows the user to perform each of the following: (a) adding a node to the tagging map; (b) subtracting a node from the tagging map; (c) specifying a description of a node of the tagging map and (d) specifying a hierarchical relationship between tagging map nodes, and wherein the applying tags to the document using the tagging map includes applying tags to the document based on user specified one or more input.

25. The system of claim 23, wherein the tagging map is a user defined tagging map having a plurality of nodes, wherein the plurality of nodes include first and second nodes that include a hierarchical relationship relative to one another that has been specified by the user using the displayed user interface and wherein there is associated to the first node and the second node respective text descriptions, wherein the generating includes using the tagging map so that text of the respective text descriptions of the first node and second node are included in the output document according to an order that is based on a hierarchy of the hierarchical relationship between the first node and the second node.

* * * * *